United States Patent
Brandau et al.

(10) Patent No.: US 11,020,818 B2
(45) Date of Patent: Jun. 1, 2021

(54) CONNECTION ELEMENT FOR AN INTERLOCKING CONNECTION TO AT LEAST ONE COMPONENT

(71) Applicant: EJOT GMBH & CO. KG, Bad Berleburg (DE)

(72) Inventors: Hannes Brandau, Tambach-Dietharz (DE); Wilfried Pinzl, Tambach-Dietharz (DE); Jörg Thiem, Zella-Mehlis (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 678 days.

(21) Appl. No.: 15/566,809

(22) PCT Filed: Apr. 15, 2016

(86) PCT No.: PCT/EP2016/058416
§ 371 (c)(1),
(2) Date: Oct. 16, 2017

(87) PCT Pub. No.: WO2016/166328
PCT Pub. Date: Oct. 20, 2016

(65) Prior Publication Data
US 2018/0099350 A1      Apr. 12, 2018

(30) Foreign Application Priority Data

Apr. 17, 2015   (DE) .................... 10 2015 207 052.2

(51) Int. Cl.
*B23K 20/12*   (2006.01)
*F16B 5/08*    (2006.01)
*B23K 35/02*   (2006.01)

(52) U.S. Cl.
CPC ...... *B23K 20/1295* (2013.01); *B23K 35/0288* (2013.01); *F16B 5/08* (2013.01)

(58) Field of Classification Search
CPC ............ B23K 20/1295; B25K 35/0288; F16B 37/061; F16B 5/04; F16B 5/08
See application file for complete search history.

(56) References Cited

U.S. PATENT DOCUMENTS 3,095,777 A * 7/1963 Hallock .................. F16B 17/00
                                                    411/501
3,279,517 A * 10/1966 Logan ..................... F16B 35/06
                                                    411/171
(Continued)

FOREIGN PATENT DOCUMENTS

CN       102947044 A     2/2013
CN       104023869 A     9/2014
(Continued)

OTHER PUBLICATIONS

International Preliminary Report on Patentability and English Translation of the Written Opinion of the International Searching Authority for International Application No. PCT/EP2016/058416 (Forms PCT/IB/338, PCT/IB/373 and PCT/ISA/237), dated Oct. 26, 2017.

(Continued)

*Primary Examiner* — Matthew R McMahon
(74) *Attorney, Agent, or Firm* — Birch, Stewart, Kolasch & Birch, LLP

(57) ABSTRACT

A connection element for an interlocking connection to at least one component includes at least one component held between the connection element and a securing element wherein the connection element and the securing element enter into a friction welded connection, having a head with a drive and a shaft having at least two cutting structures on a front side. The at least two cutting structures have cutting edges situated in a cutting plane, wherein the cutting plane borders the shaft, and the at least two cutting structures are also spaced apart in the circumferential direction and define a cutting diameter. A cross-section of the shaft has a reduced (Continued)

extension between the cutting structures relative to the cutting diameter, wherein the area of the reduced extension extends in the axial direction at least with the length of the cutting diameter from the cutting structures in the direction of the head.

11 Claims, 7 Drawing Sheets

(56) References Cited

U.S. PATENT DOCUMENTS

| | | | |
|---|---|---|---|
| 3,477,155 A | 11/1969 | Feld et al. | |
| 4,003,286 A * | 1/1977 | Hallock | B23P 19/062 |
| | | | 411/495 |
| 4,231,280 A * | 11/1980 | Gross | F16B 15/04 |
| | | | 29/432 |
| 4,555,838 A | 12/1985 | Müller | |
| 8,486,508 B2 * | 7/2013 | Christ | B23K 20/1295 |
| | | | 428/139 |
| 10,239,115 B2 * | 3/2019 | Hornbostel | B29C 66/1122 |
| 10,406,592 B2 * | 9/2019 | Blacket | B23K 20/127 |
| 10,458,457 B2 * | 10/2019 | Babej | F16B 19/10 |
| 2009/0263207 A1 | 10/2009 | Christ | |
| 2010/0088880 A1 | 4/2010 | Wang et al. | |
| 2010/0119772 A1 | 5/2010 | Christ et al. | |
| 2010/0285318 A1 * | 11/2010 | Pimper | B23K 9/207 |
| | | | 428/411.1 |
| 2011/0097142 A1 | 4/2011 | Bassler et al. | |
| 2011/0182657 A1 | 7/2011 | Eberhard et al. | |
| 2013/0094896 A1 | 4/2013 | Christ et al. | |
| 2014/0331478 A1 | 11/2014 | Dannheisig et al. | |
| 2018/0099350 A1 | 4/2018 | Brandau et al. | |

FOREIGN PATENT DOCUMENTS

| | | |
|---|---|---|
| DE | 10 2008 031 121 A1 | 11/2009 |
| JP | 2010-504215 A | 2/2010 |
| JP | 2010-526666 A | 8/2010 |
| JP | 2011-519727 A | 7/2011 |
| JP | 2018-517101 A | 6/2018 |
| WO | WO 2008/058625 A1 | 5/2008 |

OTHER PUBLICATIONS

Chinese Office Action and Search Report, dated Jan. 21, 2019, for Chinese Application No. 201680022240.9, with an English translation of the Chinese Office Action.

Japanese Office Action for Japanese Application No. 2017-553959, dated Feb. 12, 2020, with an English translation.

International Search Report, issued in PCT/EP2016/058416, dated Jul. 11, 2016.

* cited by examiner

CONNECTION ELEMENT FOR AN INTERLOCKING CONNECTION TO AT LEAST ONE COMPONENT

BACKGROUND OF THE INVENTION

The invention relates to a connection element for positive connection to at least one component, wherein the at least one component is held between the connection element and a securing element. The connection element and the securing element enter into a friction-welded connection.

DESCRIPTION OF BACKGROUND ART

Disclosed in WO 2008/058625 A1 is a connection element used to achieve an interlocking connection to at least one component, which connection element is joined to a second sheet by means of friction welding so as to secure a first sheet between the head of the connection element and the second sheet.

The connection element has a connecting body which has a hollow cylindrical shaft with an annular cutting edge so as to enable it to penetrate the retaining component while rotating and exerting a pressure on the latter.

The combination of the hollow cylindrical shaft with the annular cutting edge on its front side allows materials to be received within the hollow cylindrical part.

In particular when connecting fiber-reinforced plastic (FRP) components, the disadvantage of this design is that plastic shavings produced in the penetration process will contaminate the friction welding point on the second sheet.

It is the object of the invention to provide a connection element as well as a securing element which yield an enhanced connection consisting of a connection element and a securing element and at least one component, in particular a fiber-reinforced plastic (FRP) component, which is held between the connection element and the securing element in an interlocking manner.

SUMMARY AND OBJECTS OF THE INVENTION

The object of this connection element is achieved by the combination of elements as discussed hereinbelow.

In one aspect of the invention, a connection element for an interlocking connection to at least one component using a securing element which is joined to the connection element by friction welding comprises a head with a drive and a shaft in a known manner.

On its front side, the shaft has at least two cutting structures which have cutting edges that lie in one cutting plane. The front side of the shaft is bounded by the cutting plane. The cutting structures are spaced apart in the circumferential direction and define a cutting diameter which is cut into the component during rotation of the connection element.

In accordance with the invention, the shaft has an area of a cross-section which has a reduced extension between the cutting structures relative to the cutting diameter in the circumferential direction. The area of reduced extension is thus located in a circular sector between the sectors defined by the circumferential extension of the cutting structures.

A suitable design ensures that shavings produced when the connection element is inserted will be discharged in the axial direction against the driving direction. This allows shavings to be discharged already before a friction-welding connection is made so as to prevent them from adversely affecting the connection process. Using the connection element for connecting two FRP sheets will also prevent shavings from being pressed between the sheets in the drilling process.

Preferably, the area of reduced extension extends in the axial direction at least with the length of the cutting diameter from the cutting structure in the direction of the head. This ensures that shavings will be reliably discharged during the drilling operation.

In another advantageous embodiment, the maximum radial extension of the cutting structure in the cutting plane can be 25% at the most, in particular 20% at the most, of the cutting diameter. This creates a hollow space within the cutting structures which makes it possible for the cutting structures to penetrate the component to be cut. For this purpose, the center of the front side of the shaft can preferably be spaced from the cutting plane by up to 50% of the cutting diameter. A sufficiently large free space for penetration by the cutting structures is thus created, yet shavings are still reliably removed from the component in an ideal manner.

In particular, the shaft has a portion of a cross-sectional area of at least 60% of the area defined by the cutting diameter. This defines a ratio of the reduced extension to the cutting diameter which provides a sufficiently large connection surface for the friction-welding connection and still allows for a removal of the shavings produced in the hole cutting operation.

In another advantageous embodiment, a maximum of five cutting structures are provided. This ensures that the cutting structures will be spaced apart sufficiently even at small cutting diameters so that an expedient area of reduced extension can be provided between the cutting structures even at small cutting diameters.

The area of reduced extension can be produced by making recesses, in particular in the form of grooves, into a cylindrical shaft of the cutting diameter. Alternatively, however, the shaft itself can have a polygonal cross-section, in which case the cutting structures will be disposed in the corner regions, in which case the outer circle of the polygon will correspond to the cutting diameter.

Preferably, the shaft is made from a solid material. The shaft can have a diameter of less than 2.5 mm. This is advantageous in that the matrix of the FRP material will be damaged as little as possible. Advantageously, the connection element can be of a thin design for which purpose the length of the shaft will in particular be more than 1.5 times the size of the cutting diameter.

In another embodiment, the area of reduced extension can be adapted to steadily approach the cutting diameter in the direction of the head. What results is a maximum cross-sectional connection of the head to the shaft, which allows the transmission of high torques without the head being twisted off the shaft in the process.

In a second aspect thereof, the invention relates to a securing element for an interlocking connection to at least one component, by friction welding the securing element to at least one connection element that extends through at least one component.

The securing element has a circumferential edge region adapted to abut on a composite component, with the front side of the edge region defining an abutment plane.

According to the invention, the edge region transitions toward the interior into a deposit area which is spaced from the abutment plane in the normal direction. The securing element furthermore has a welding area on the inside of the deposit area. The welding area is raised relative to the deposit area in the direction of the abutment plane and the welding area is spaced from the abutment plane and thus does not reach up to the abutment plane.

What is advantageous about a securing element of such design is that when the connection element penetrates at least one component in a shaving-removing manner, shavings falling out of the lowermost sheet can be removed from the welding area and discharged to the deposit area. This considerably increases the quality of the welding connection between the connection element and the securing element since interfering shavings will be discharged from the welding area.

More specifically, the deposit area is of a circumferential design and thus completely encompasses the welding area. Shavings falling onto the welding area can thus be discharged in all directions. This especially affects shavings subjected to a centrifugal force.

In yet another preferred embodiment, the securing element has anti-rotation means adapted to retain the securing element in the direction of rotation. Preferably, said anti-rotation means is provided in the form of a conventional screw drive, in particular an external drive, such as a hexagonal recess. This can prevent the securing element from being entrained in rotation during the friction-welding operation or even enable the securing element to rotate itself in a direction opposite to the direction of rotation of the connection element.

Such a design can also be used to exert a torque on the securing element, if necessary, which torque is opposite to a rotary force acting on the securing element so as to achieve shearing of the material connection of the connection element and the securing element. This will allow components mounted between the connection element and the securing element to be separated from each other again.

In another preferred embodiment, the welding area is of a convex, a conical or a frusto-conical shape. As a result, shavings can be discharged from the welding area. At the same time, a sufficiently large abutment surface exists for producing a friction-welded connection.

Preferably, the securing element can be rotationally symmetrical within its peripheral region, with notably the deposit region and the welding area being coaxially mounted. This facilitates the production of the securing element.

Advantageously, the area of the largest extension of the welding area can be larger than 1.5 mm, in particular larger than 2.0 mm. This ensures a sufficiently large welding area so as to produce a strong connection of a securing element and a connection element. This is in particular the case if the maximum cutting diameter of the connection element is 2.5 mm.

In another embodiment, the distance of the welding area from the abutment region can be higher than 1.0 mm. This will ensure that there is sufficient free volume between the component to be connected and the securing element to make sure that the shavings will slide into the deposit region.

To enable a compact design, the radial extension of the deposit area can have a diameter of less than 5.0 mm.

In another advantageous embodiment, it can be provided for the edge region to be designed such that the latter will form an undercut with respect to the deposit area. As a result, a connection element will not only enter into a material connection with the securing element by way of its shaft which is deformed on the securing element, but will also be positively connected thereto in the axial direction via the undercut.

In yet another aspect, the invention relates to a connection system for connecting a plurality of composite sheets, in particular FRP sheets, comprising a connection element of the aforementioned type and a securing element of the aforementioned type, with the connection element being adapted to be welded together with the securing element after it has penetrated the composite sheets in a self-drilling manner.

Preferably, the connection system can be designed such that the diameter of the welding area of the securing element is 25% larger than the cutting diameter of the connection element.

In another advantageous embodiment of the connection system, the welding area of the securing element and the front side of the shaft of the connection element can be of a matching design. For example, a welding area of a convex design can be matched to a concavely shaped front side of the shaft of the connection element. This provides a maximum contact surface and thus results in rapid heating up at the friction-welding point.

The invention furthermore relates to a connection between components comprising at least two composite sheets by means of a connection element having a head and a shaft, which shaft extends through said composite sheets in a driving direction and produces a friction-welded connection to a securing element which latter abuts on the side of the composite sheet which faces away from the head of the connection element and forms a hollow space therewith in which shavings of at least one composite sheet will be contained, with the composite sheets being positively connected to each other between the head and the securing element.

This provides a strong connection of the composite sheets made in particular from FRP by means of the connecting element and the securing element with only minor damage to the fiber structure.

Additional advantages, features and possible applications of the present invention will become apparent from the description which follows, in combination with the embodiments illustrated in the drawings.

BRIEF DESCRIPTION OF THE DRAWINGS

Throughout the description, the claims and the drawings, those terms and associated reference signs are used as are listed in the List of Reference Signs below. In the drawings:

FIG. 10 is a perspective view of a connection element according to the invention;

DETAILED DESCRIPTION OF THE INVENTION

Figure 1A:
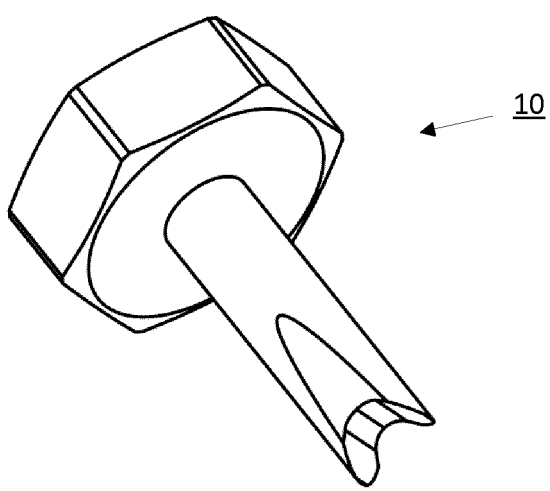
FIG. 1A is a perspective view of a connection element according to the invention.
Figure 1B:
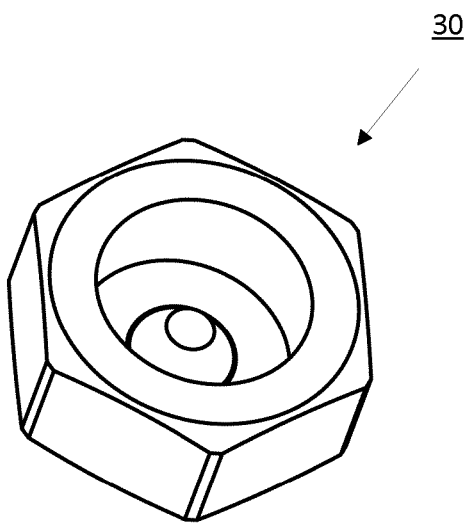
FIG. 1B is a perspective view of a securing element according to the invention.

FIG. 1A is a perspective view of a connection element 10 according to the invention. FIG. 1B is a view of a securing element 30 which corresponds to the connection element 10 of FIG. 1A, to which the connection element is materially connected in a friction-welding process after it has penetrated a securing structure having at least one component. The connection element 10 illustrated in FIG. 1A and the securing element 30 illustrated in FIG. 1B together form a connection system.

FIG. 10 is a perspective view of another embodiment of a connection element 40 according to the invention. FIG. 10 is a perspective view of a securing element 50 according to the invention. The connection element 40 and the securing element 50 are matched to each other so as to yield an as large as possible frictional surface at the point where the elements make contact.

Figure 2A:
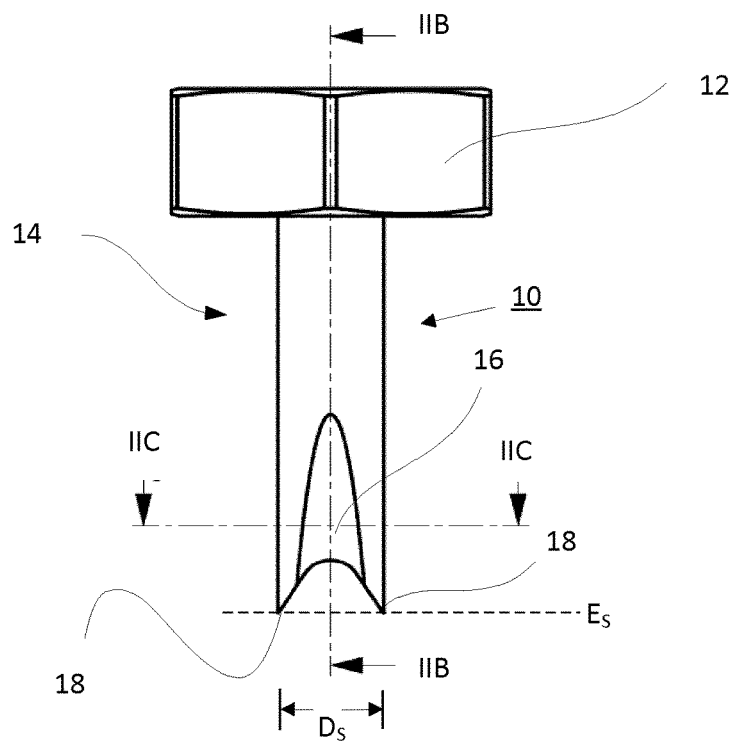
FIG. 2A is a front view of a connection element according to the invention.

FIG. 2A is a front view of a connection element 10 according to the invention for producing a friction-welded connection to a securing element, in particular of the type illustrated in FIG. 1B, to enable a securing structure to be held between a head 12 of the connection element 10 and the securing element. The connection element 10 has a cylindrical shaft 14 the front side of which terminates in a cutting plane $E_S$ in which two cutting edges 18 are situated. The cutting edges define a cutting diameter $D_S$ which can be used to form a hole in the securing structure in a shaving-removing manner.

The shaft 14 has a chamfer 16 which extends from the cutting plane $E_S$ towards the head 12. Furthermore, another chamfer (see FIG. 2B) is provided opposite this chamfer 16, which results in an area of reduced cross-section with respect to the cutting diameter $D_S$ in the region of the chamfers 16. This is shown in more detail in FIG. 2C. The shavings removed from the securing structure by the cutting edges 18 will thus be discharged axially from the cutting plane $E_S$ towards the head 12 within the chamfers 16 as a result of the rotation of the connection element 10 and will thus be conveyed out of the securing structure against the drilling direction.

When the chamfers 16, 20 are formed, this also creates the cutting structures 18 located on the front side of the shaft 14 in a single step.

A recess is provided between the cutting edges. This recess acts to space the center of the shaft end from the cutting edge $E_S$ by approx. half of the cutting diameter $D_S$. This ensures that the cutting edges 18 will reliably penetrate the securing structure.

Figure 2B:
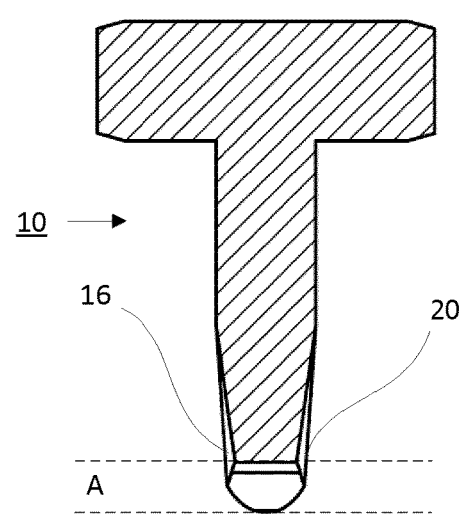
FIG. 2B is a longitudinal sectional view of a connection element of FIG. 2A.

FIG. 2B is a longitudinal sectional view IIB-IIB with opposing chamfers 16, 20 located in the area of the shaft end. The depth of the chamfers 16, 20 decreases constantly with a small pitch in the direction of the head 12. This view also shows the distance A of the point of intersection of the shaft front face with the central axis from the cutting plane $E_S$. This distance is 50% of the cutting diameter $D_S$.

Figure 2C:
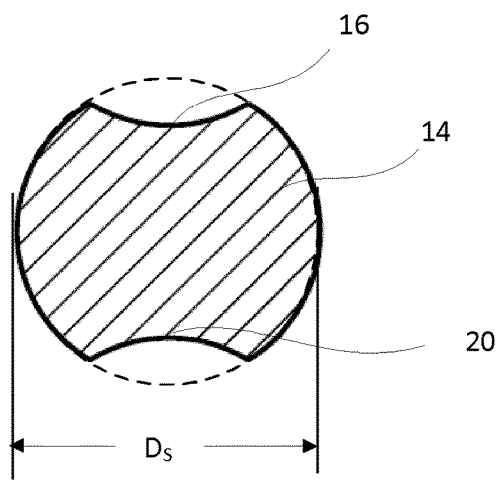
FIG. 2C is a cross-sectional view of a shaft of a connection element of FIG. 2A.

FIG. 2C is a cross-sectional view IIC-IIC through the shaft 14, said cylindrical shaft 14 having the cutting diameter $D_S$. Furthermore, this view clearly shows the design of the areas of reduced extension created by the chamfers 16, 20. These recesses which extend in an axial direction act to discharge the shavings produced at the cutting edge in an axial direction against the drilling direction.

Figure 3A:
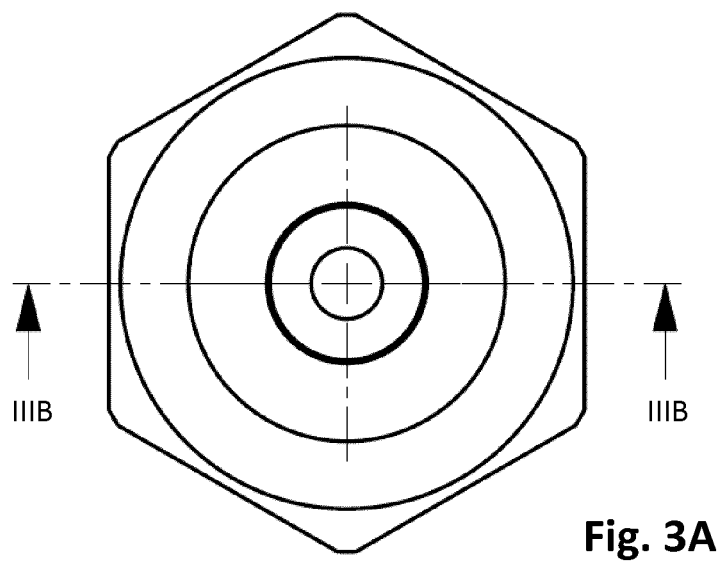
FIG. 3A is a top view of a securing element of FIG. 1B.

FIG. 3A is the top view of a securing element 30 according to the invention as shown in FIG. 1B whose design matches that of the connection element 10.

Figure 3B:
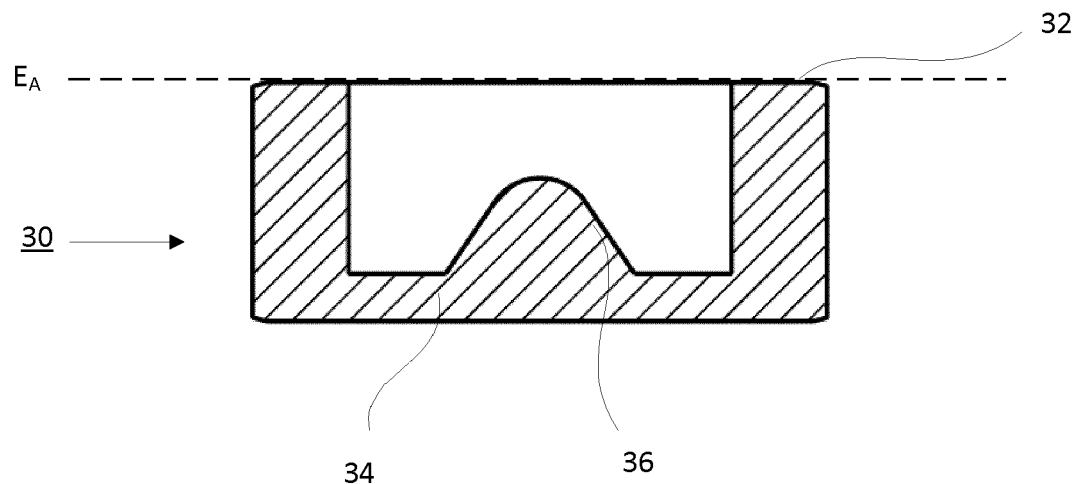
FIG. 3B is a sectional view of a securing element of FIG. 3A.

FIG. 3B is a sectional view along lines IIIB-IIIB of FIG. 3A of a rotationally symmetrical securing element 30 according to the invention which is provided for securing a connection element 10 of the type illustrated in the views of FIG. 2A to 2C. The securing element 30 has a hexagonal outer contour, with the edge area 32 defining an abutment plane $E_A$.

Figure 1C:
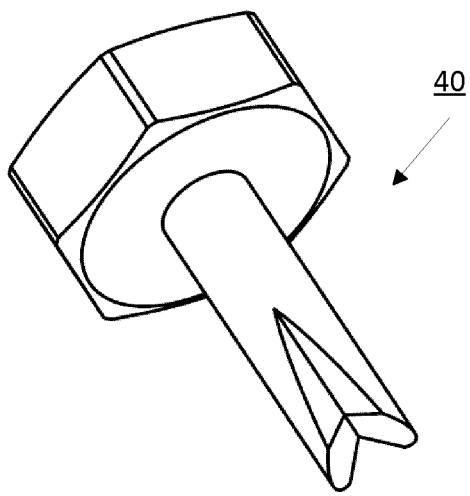
FIG. 1D is a perspective view of a securing element according to the invention.

On the interior of the edge area, a deposit area 34 is provided which is spaced from the abutment plane $E_A$. As seen in the embodiment illustrated in FIG. 1C, the deposit area 34 is of an annular design. Provided within this annular deposit area 34 is a welding area 36 which is raised towards the abutment plane $E_A$ with respect to the level of the deposit area 34. The welding area 36 is of a convex spherical-cap shape, with the curvatures of the front face of the connection element 10 (FIG. 1A) and the welding area 36 being matched to each other. This first of all provides an as large as possible abutment surface between the components to be joined in a friction-welding process. Secondly, the raised spherical-cap shaped portion promotes the sliding down of shavings falling into the securing element during rotation of the connection element 10. This ensures that no shavings will remain in the zone of the joint which would adversely affect the friction-welded connection of the connection element to the securing element 30.

Figure 4A:
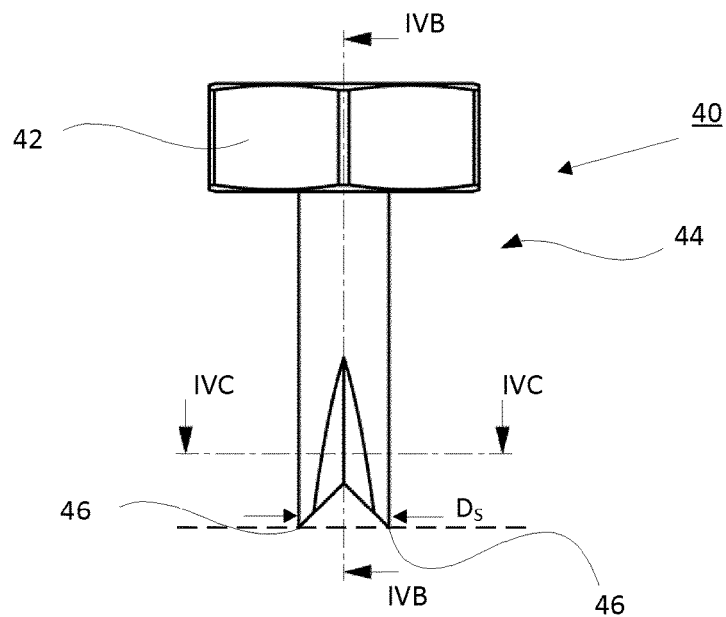
FIG. 4A is a front view of an inventive connection element of FIG. 10.

FIG. 4A is a front view of another inventive embodiment of a connection element 40 comprising a head 42 and a shaft 44. Also the embodiment of FIG. 4A has cutting edges 46 on the front side end of the shaft, which cutting edges 46 are adapted to cut holes in a shaving-removing manner. In contrast to FIG. 1A, the recesses 47A are made into the cylindrical shaft 44 in the shape of a wedge, in particular by pinching, Same as in FIG. 1A, in this embodiment, the recess also extends in the axial direction from the cutting plane toward the head with a length that is longer than the cutting diameter DS.

Figure 4B:
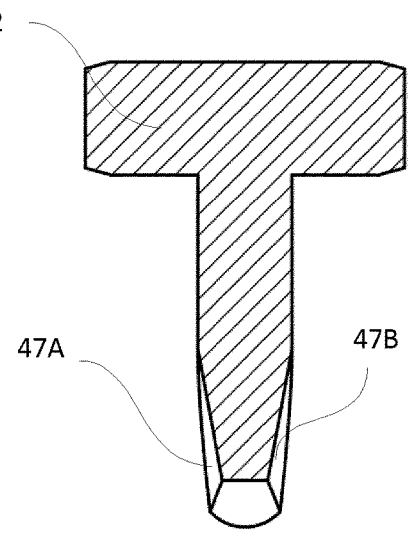
FIG. 4B is a longitudinal sectional view of a connection element of FIG. 4A.

FIG. 4B is a sectional view taken along lines IVB-IVB of FIG. 4A: This sectional view shows the course of the recesses 47A, 47B. The extension of the cross-section in the area of reduced extension increasingly diminishes in the direction of the head. The depth of the recess decreases towards the head 42 up to a point where the complete shaft cross-section is reached again.

Figure 4C:
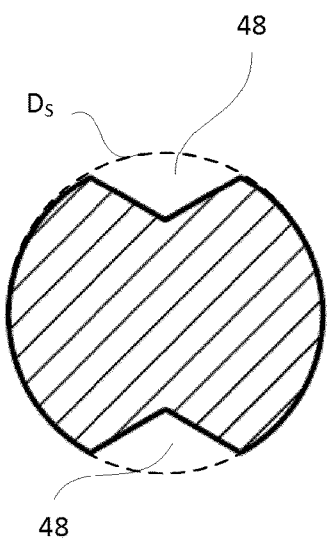
FIG. 4C is a cross-sectional view of a shaft of a connection element of FIG. 4A.

FIG. 4C is a cross-sectional view of the shaft 44 taken along the cutting lines IVC-IVC of FIG. 4A, which produces areas of smaller extension 48 with respect to the cutting diameter $D_S$. The wedge-shaped recess illustrated in FIGS. 2A and 2B has the advantage that it can be produced particularly easily and yet ensures a reliable discharge of the shavings from the cutting area.

Figure 1D:
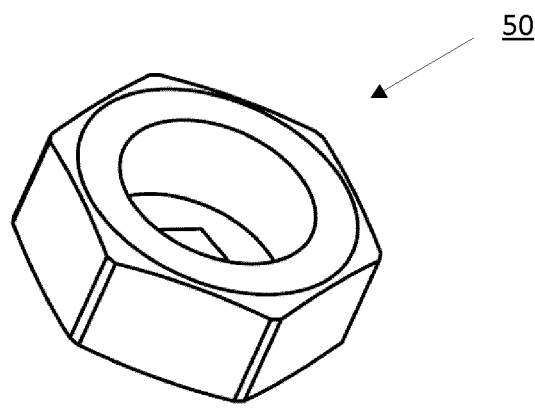
Figure 5A:
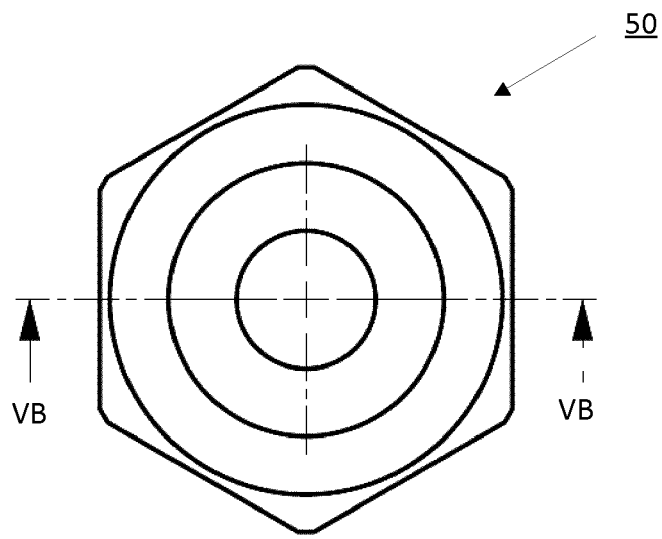
FIG. 5A is a top view of an inventive securing element of FIG. 10.

FIG. 5A is a top view of a securing element 50 according to the invention as seen in FIG. 1D which is of a design that matches the connection element 40.

Figure 5B:
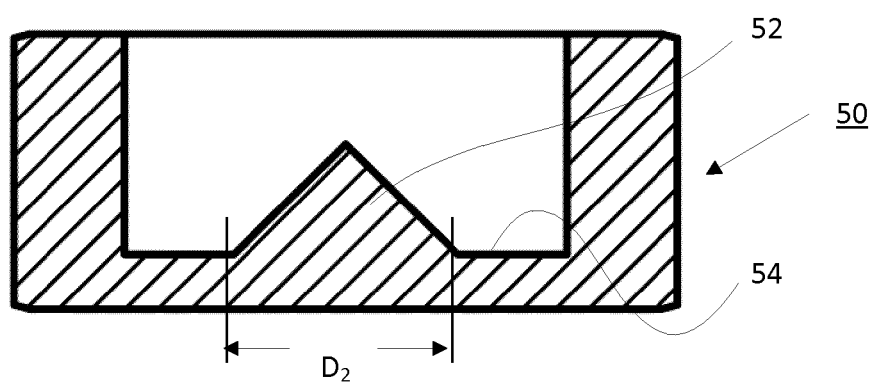
FIG. 5B is a sectional view of an inventive securing element of FIG. 5A.

FIG. 5B is a sectional view taken along lines VB-VB of FIG. 5A. In contrast to the securing element illustrated in FIG. 1C, the welding area 52 is of a conical design here. Also this design allows the shavings produced during the penetration process to slide into the deposit area 54. Moreover, this design provides an as large as possible frictional surface for a connection element 40 having the design illustrated in FIG. 2A. The welding diameter $D_2$ of the securing element 50 corresponds roughly to the cutting diameter $D_S$ of the connection element 40. This provides an ideal joining zone and ensures fast fusing of the components 40, 50 to be joined.

Figure 6:
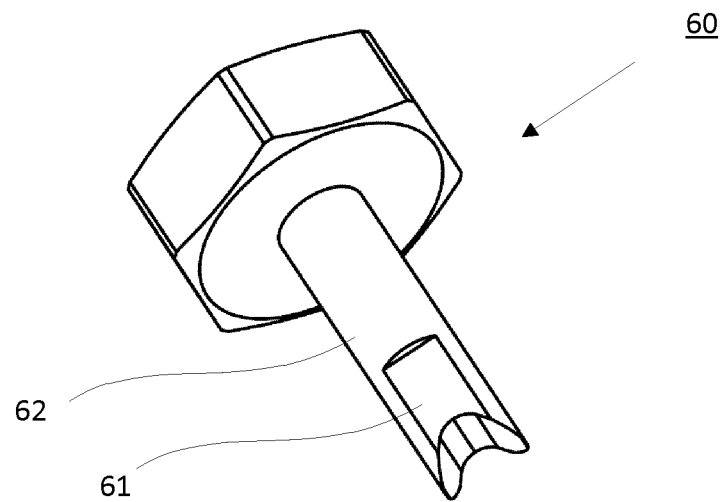
FIG. 6 is a perspective view of a connection element according to the invention.

FIG. 6 is a perspective view of a connection element 60 according to the invention, in which the area of reduced extension is produced by providing a groove 61 in the cylindrical shaft 62 of the connection element 60. The base of the groove 61 extends parallel to the axis of the connection element 60 and, at its end facing the head, increases to the level of the circumferential surface of the shaft 62.

Figure 7:
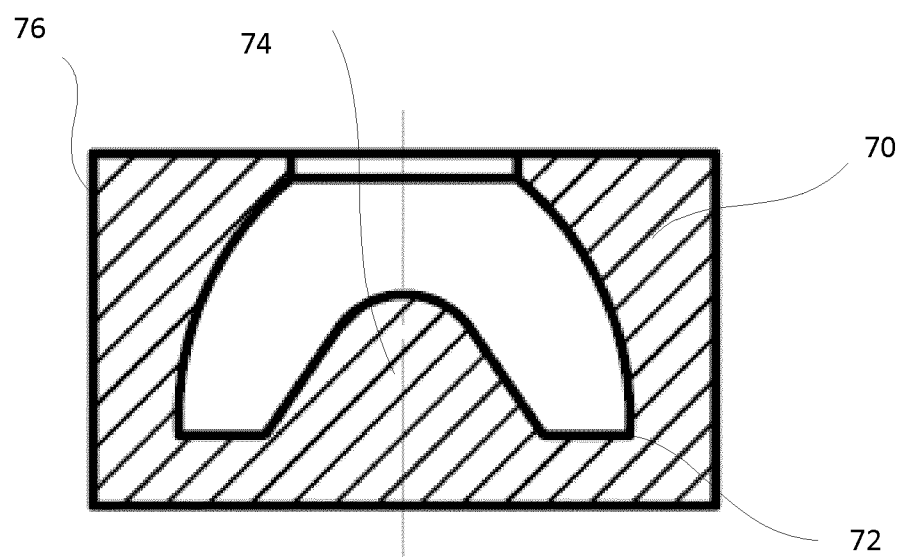
FIG. 7 is a sectional view of another inventive embodiment of a securing element.

FIG. 7 is a sectional view of another embodiment according to the invention of a securing element 70 which has an annular deposit area 72 within which a hemispherical welding area 74 is provided. The radial extension of the abutment area 76 is designed such that the latter will at least partially extend beyond the deposit area 72 in the radial direction, thus forming an undercut. This has the advantage that the fusing of the components to be joined results in a widening of the weld bead, resulting in an additional interlocking connection, besides the material connection, in the embodiment corresponding to the view of FIG. 9.

Figure 8:
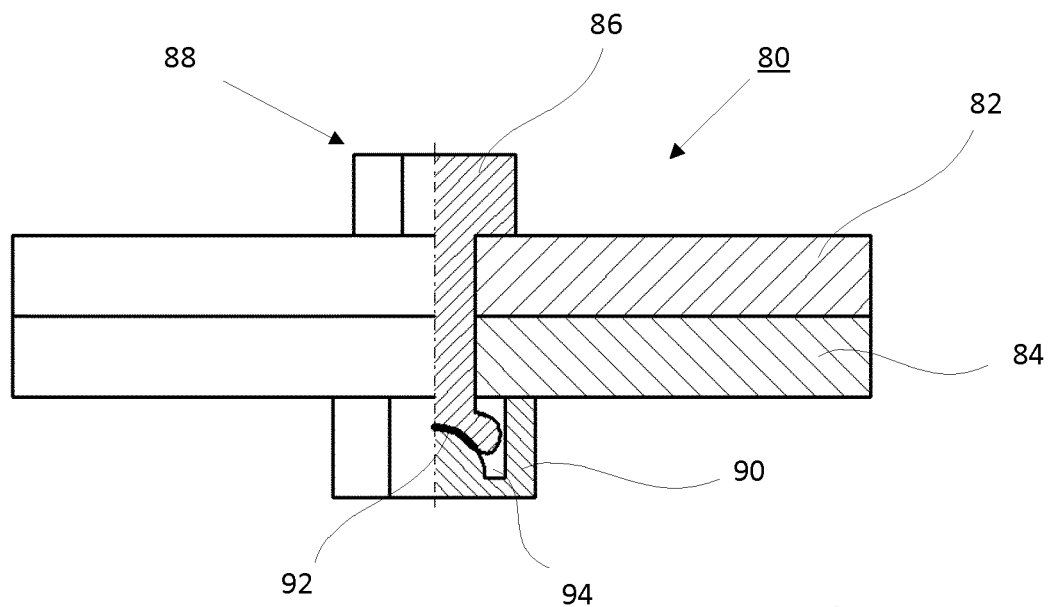
FIG. 8 is a partial sectional view of a component connection according to the invention.

FIG. 8 is a partial sectional view of a component connection 80 according to the invention, comprising a first composite sheet 82 and a second composite sheet 84. Both composite sheets 82, 84 are made of FRP. Both composite sheets are held together according to the invention by providing an interlocking connection between the head 86 of a connection element 88 and a securing element 90. The connection between the connection element 88 and the securing element 90 is produced by providing a friction-welded connection between the connection element 88 and the securing element 90 at the joining zone 92 where the shaft of the connection element 88, once it has penetrated the composite sheets 82, 84 in a shaving-removing manner as described above, is then secured in place. During the shaving-removing hole forming process, shavings produced as a result of the aforementioned design of the connection element 88 will be discharged from the connection of composite sheets for as long as the portion of the shaft provided with a groove projects from the topmost composite sheet 82. However, as it is not possible to discharge all shavings against the drilling direction, the remaining shavings will be received in the deposit area 94 of the securing element 90. The shavings held there will thus not adversely affect the friction-welded connection. Despite a preferably small diameter of the shaft, this will ensure a high connection strength. As can be seen from the partial sectional view of FIG. 8, both the connection element 88 and the securing element 90 have an external drive in the shape of a hexagon. This is a common form of drive.

Figure 9:
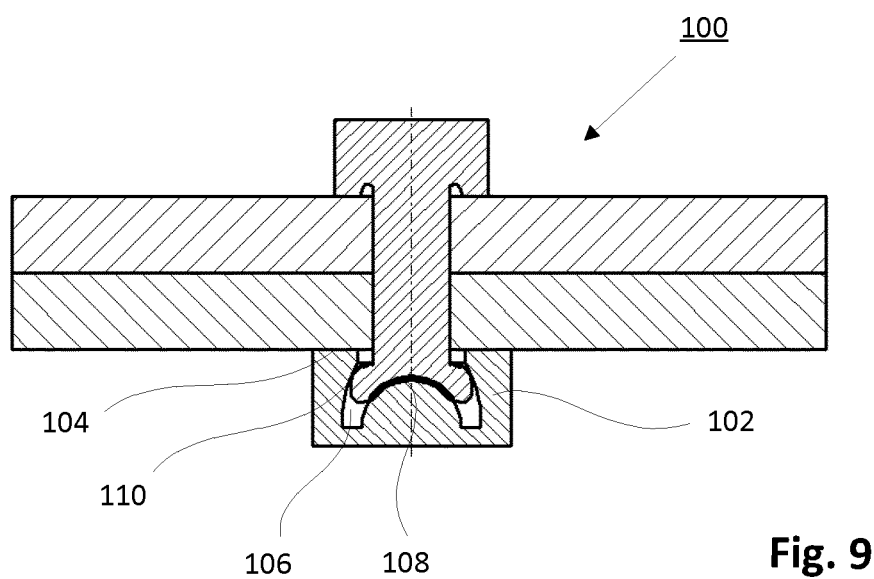
FIG. 9 is a sectional view of a component connection according to the invention.

FIG. 9 is a sectional view of a component connection 100 according to the invention, similar to the view of FIG. 8, in which the securing element 102 according to the embodiment of FIG. 7 is shown. It can clearly be seen in this sectional view that the abutment area 104 extends somewhat beyond the deposit area 106 of the securing element 102 in the radial direction. The friction weld bead 110 formed thus provides an interlocking connection in addition to the material connection at the joining zone 108.

The invention claimed is:

1. Connection element for positive connection to at least one component, said at least one component is held between the connection element and a securing element, and said connection element and said securing element enter into a friction-welded connection, comprising:
a head with a drive and a shaft, said shaft includes a solid section extending from the head to a front side thereof, said front side includes at least two cutting structures,
said cutting structures have cutting edges that lie in a cutting plane, wherein the cutting plane bounds the shaft,
said cutting structures are also spaced apart in the circumferential direction and define a cutting diameter,
wherein the shaft also has a cross-section having chamfers defining an area of reduced extension between the cutting structures relative to the cutting diameter, wherein the chamfers defining the area of reduced extension extend in the axial direction from the cutting structures towards the head at least the length of the cutting diameter, said chamfers discharge shavings axially towards the head.

2. Connection element according to claim 1, wherein the maximum radial extension of the cutting structures in the cutting plane is 25% at the most, of the cutting diameter.

3. Connection element according to claim 1, wherein the shaft has a cross-sectional area of at least 60% of the area defined by the cutting diameter.

4. Connection element according to claim 1, wherein a maximum of five cutting structures are provided.

5. Connection element according to claim 1, wherein the center of the front side of the shaft is spaced from the cutting plane in the direction of the head by a maximum of 50% of the cutting diameter.

6. Connection element according to claim 1, wherein the area of reduced extension is produced by providing recesses in the shaft.

7. Connection element according to claim 1, wherein the shaft is cylindrical.

8. Connection element according to claim 1, wherein the cutting diameter is ≤2.5 mm.

9. Connection element according to claim 1, wherein the reduced extension decreases constantly in the direction of the head.

10. Connection element according to claim 1, wherein the maximum radial extension of the cutting structures in the cutting plane is 20% at the most, of the cutting diameter.

11. Connection element according to claim 1, wherein the area of reduced extension is produced by providing grooves in the shaft.

* * * * *